(12) United States Patent
Wu et al.

(10) Patent No.: US 11,336,935 B1
(45) Date of Patent: May 17, 2022

(54) DETECTING AUDIO-VIDEO DESYNCRHONIZATION

(71) Applicant: Amazon Technologies, Inc., Seattle, WA (US)

(72) Inventors: Yongjun Wu, Bellevue, WA (US); Joshua Peter Ebenezer, Travis, TX (US); Sriram Sethuraman, Bangalore (IN); Hai Wei, Seattle, WA (US); Zongyi Liu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/247,065

(22) Filed: Nov. 25, 2020

(51) Int. Cl.
| | |
|---|---|
| *H04N 21/242* | (2011.01) |
| *G06K 9/00* | (2022.01) |
| *H04N 21/2187* | (2011.01) |
| *H04N 21/233* | (2011.01) |
| *H04N 21/234* | (2011.01) |
| *H04N 21/24* | (2011.01) |

(52) U.S. Cl.
CPC ....... *H04N 21/242* (2013.01); *G06K 9/00724* (2013.01); *H04N 21/2187* (2013.01); *H04N 21/233* (2013.01); *H04N 21/23418* (2013.01); *H04N 21/2407* (2013.01); *G06K 2009/00738* (2013.01)

(58) Field of Classification Search
CPC ............. H04N 21/242; H04N 21/2407; H04N 21/2187; H04N 21/233; H04N 21/23418; G06K 9/00724; G06K 2009/00738
See application file for complete search history.

(56) References Cited

U.S. PATENT DOCUMENTS

| | | | |
|---|---|---|---|
| 5,844,600 A * | 12/1998 | Kerr | H04N 21/242 |
| | | | 348/14.12 |
| 6,480,902 B1 * | 11/2002 | Yuang | H04L 29/06 |
| | | | 348/423.1 |
| 7,692,724 B2 | 4/2010 | Arora et al. | |
| 8,363,161 B2 | 1/2013 | Pearlstein | |
| 8,400,566 B2 | 3/2013 | Terry et al. | |
| 9,565,426 B2 * | 2/2017 | Yang | H04N 17/004 |
| 9,602,858 B1 * | 3/2017 | Kaiser | H04N 21/233 |
| 10,158,927 B1 * | 12/2018 | Lei | H04N 21/4307 |
| 10,354,354 B2 * | 7/2019 | Zhao | H04N 19/467 |
| 2006/0146185 A1 * | 7/2006 | Chen | H04N 21/4325 |
| | | | 348/410.1 |
| 2007/0276670 A1 * | 11/2007 | Pearlstein | H04N 21/4341 |
| | | | 704/270 |
| 2008/0263612 A1 | 10/2008 | Cooper | |
| 2014/0315610 A1 * | 10/2014 | Shachar | A63B 71/02 |
| | | | 463/7 |
| 2015/0324636 A1 * | 11/2015 | Bentley | A63F 13/00 |
| | | | 386/227 |
| 2016/0322078 A1 * | 11/2016 | Bose | H04N 5/247 |

(Continued)

OTHER PUBLICATIONS

Relative Timing of Sound and Vision for Broadcasting, ITU, 1998 (https://www.itu.int/dms_pubrec/itu-r/rec/bt/RREC-BT.1359-1-199811-I!!PDF-E.pdf).

(Continued)

*Primary Examiner* — Fernando Alcon
(74) *Attorney, Agent, or Firm* — Weaver Austin Villeneuve & Sampson LLP

(57) ABSTRACT

Techniques are described for detecting desynchronization between an audio stream and a video stream.

20 Claims, 2 Drawing Sheets

(56) References Cited

U.S. PATENT DOCUMENTS

| | | | | |
|---|---|---|---|---|
| 2017/0238055 A1* | 8/2017 | Chang | ............... | G06F 3/012 725/19 |
| 2019/0132372 A1* | 5/2019 | Litsyn | ............... | H04L 67/12 |
| 2021/0142066 A1* | 5/2021 | Jayaram | ............ | G06K 9/00758 |

OTHER PUBLICATIONS

Owens et al., "Audio-visual scene analysis with self-supervised multisensory features." Proceedings of the European Conference on Computer Vision (ECCV). 2018.

Khosravan et al., "On Attention Modules for Audio-Visual Synchronization." CVPR Workshops. 2019.

Korbar et al., "Cooperative Learning of Audio and Video Models from Self-Supervised Synchronization" In the Proceedings of 32nd Conference on Neural Information Processing Systems, Montreal, Canada, 2018.

Tran et al., "Learning Spatiotemporal Features with 3D Convolutional Networks", arXiv:1412.0767.

Choi et al., "Why Can't I Dance in the Mall? Learning to Mitigate Scene Bias in Action Recognition," https://arxiv.org/abs/1412.0767.

Chung et al., "Out of time: automated lip sync in the wild", In ACCV Workshop on Multi-view Lip-reading, ACCV, 2016.

Tran et al., "A closer look at spatiotemporal convolutions for action recognition." Proceedings of the IEEE conference on Computer Vision and Pattern Recognition. 2018.

Chung et al., "Voxceleb2: Deep speaker recognition." *arXiv preprint arXiv*:1806.05622 (2018).

Xiao et al., "Audiovisual SlowFast Networks for Video Recognition." Facebook AI Research (FAIR), (2020).

Chung et al., "Perfect Match: Improved Cross-Modal Embeddings for Audio-Visual Synchronisation," (2019).

U.S. Appl. No. 17/304,835, filed Jun. 25, 2021, Chatterjee et al.

\* cited by examiner

DETECTING AUDIO-VIDEO DESYNCRHONIZATION

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

A recurring challenge in providing media content to consumers is maintaining synchronization between an audio stream and a video stream, as consumers may be dissatisfied if an audio stream excessively leads or lags its associated video stream. Thus, it would be desirable to provide techniques for identifying audio-visual desynchronization and for synchronizing audio content and video content.

DETAILED DESCRIPTION

This disclosure describes techniques for techniques for identifying audio-visual desynchronization and for synchronizing audio content and video content. A media content provider providing a given piece of media content may want to check the media content for audio-visual desynchronization, as consumers can be dissatisfied if an audio stream excessively leads or lags its associated video stream. The present disclosure provides a mechanism to identify audio-visual desynchronization. As an example, a media content provider can identify certain kinds of audio events (e.g., the sound of a tennis ball being hit by a racket, a tennis ball bouncing on a court, a basketball bouncing on a court or other structure, a baseball being hit by a bat, etc.) and can then analyze temporally-adjacent portions of the accompanying video stream for the presence of corresponding visual events (e.g., a tennis ball, basketball, or baseball rapidly changing directions across a small number of video frames). In some implementations, a machine learning model may be trained and then used in identifying audio events within an audio stream, while an additional machine learning model is trained and then used in identifying corresponding visual events within a video stream. When the machine learning models identify an audio event at a given time within the audio stream, but are unable to identify a corresponding visual event within the video stream and within a temporal window include the given time, it may be determined that the audio and visual streams are desynchronized. In some implementations, the size of the temporal window in which the machine learning model searches for a corresponding visual event may be based on the smallest humanly-perceptible level of audio-visual desynchronization and/or may be based on the largest level of audio-visual desynchronization that users can perceive but still generally tolerate as acceptable. An example may be instructive.

Figure 1:
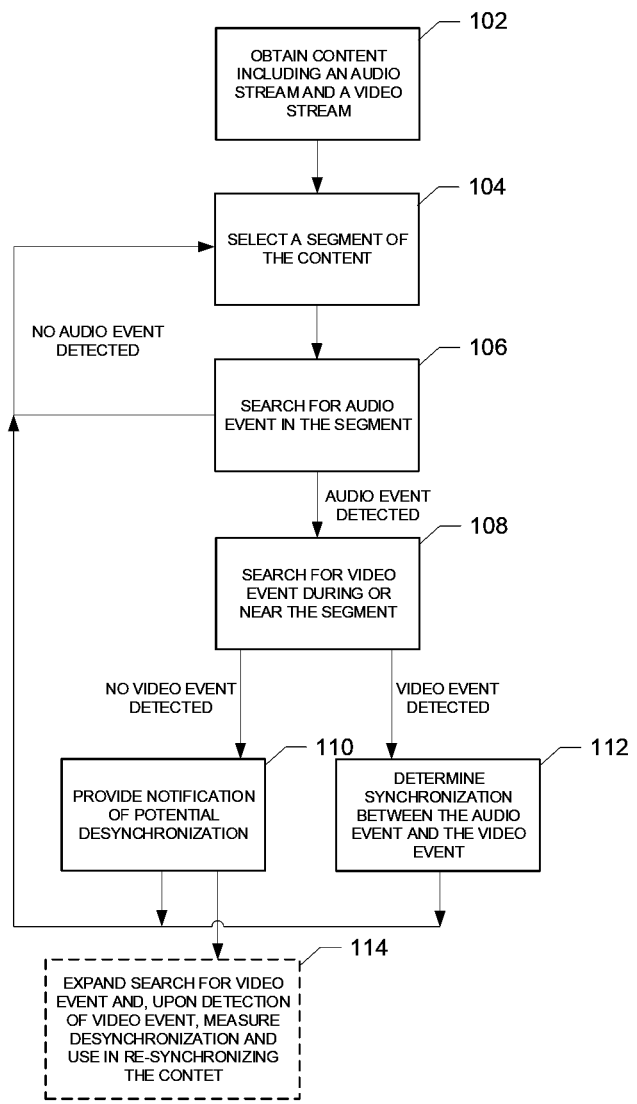
FIG. 1 is a flowchart illustrating operation of a particular implementation.

FIG. 1 sets forth a flow for detecting desynchronization between a video stream and an associated audio stream. The flow of FIG. 1 can be performed at any time (e.g., during a livestream, upon obtaining new recorded content, upon receiving a playback request for a piece of content, as a scheduled maintenance task, etc.). As an example, the flow of FIG. 1 can involve obtaining live content and, in real-time, detecting if the audio and video streams of the live content are desynchronized.

Figure 2:
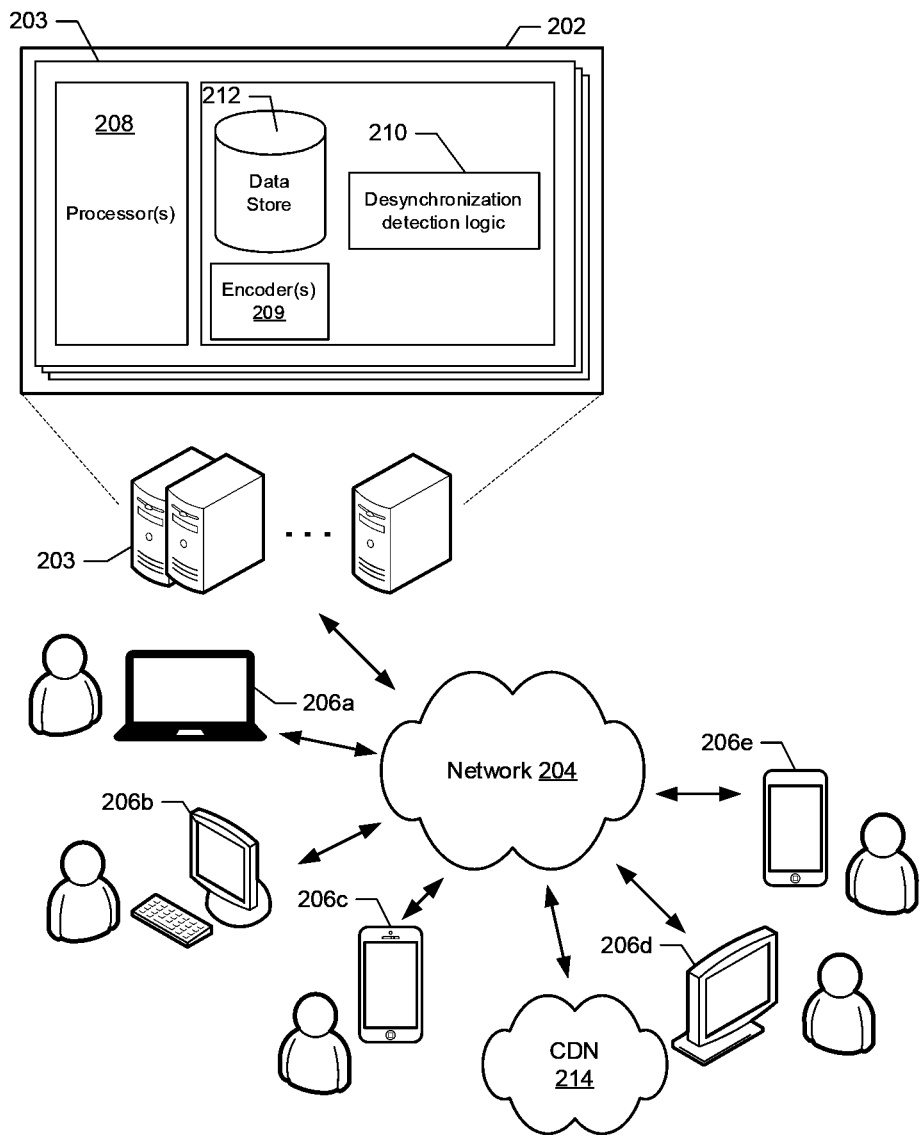
FIG. 2 is a simplified diagram of a computing environment in which various implementations may be practiced.

A system, such as content service 202 of FIG. 2, may obtain content that includes an audio stream and an associated video stream (102). Next, a segment of the content may be selected (104) and the system may search for an audio event in the segment (106). The system may, in some implementations, search for the audio event in the segment using a machine learning model trained to identify the presence of one or more specific types of audio events. In some implementations, the machine learning model takes, as its inputs, audio segments having a length of about 80 milliseconds (ms). In some other implementations, the machine learning model takes, as its inputs, audio segments having length of about 160 ms. If desired, the machine learning model may be configured to analyze audio segments of any desired length including, as examples, a length of about 40 ms, about 60 ms, about 100 ms, about 120 ms, about 140 ms, about 160 ms, about 180 ms, about 200 ms, or greater than about 200 ms. In some implementations, the audio segments analyzed by the system (in 106) may be separated by a gap of approximately 40 ms, which may correspond to the duration between video frames in the content. The machine learning model may be trained to identify the presence of audio events such as, but not limited to, a tennis ball bouncing off a court, a tennis ball being hit by a racket, a tennis ball bouncing on a court, a basketball bouncing on a court or other structure, a baseball being hit by a bat, a cricket ball being hit by a bat, the striking of a percussion instrument, an axe chopping wood, an arrow or other projectile hitting a target, a skier carving a turn, or any other event which produces an identifiable pattern of sounds. In some implementations, there may be multiple machine learning models, each of which is trained to recognize a different type of audio event. In some other implementations, a single machine learning model may be trained to recognize a plurality of types of audio events.

When the system doesn't find an audio event in the present segment of the content, the system may select another segment of the content (at 104). In some implementations, the system may continue selecting segments (at 104) until the entire content is analyzed or until some other condition is satisfied. As an example, if the system determines that the video and audio streams are desynchronized along at least one portion of the content, the system may cease analyzing additional segments.

If the system detects an audio event (at 106), the system may then search for a corresponding video event (108). In some implementations, the system may search for a video event that occurs within a time window that includes the detected audio event. Additionally, the time window may be determined based on the limits of human perception and/or the limits of what consumers find to be acceptable desynchronization limits. In particular, humans are generally unable to perceive when audio lags the corresponding video by less than approximately 125 ms or when the audio leads the corresponding video by less than approximately 45 ms. Similarly, humans generally indicate a subjective acceptability of media content, at least for lip-sync errors, when the audio lags the video by less than approximately 200 ms or when the audio leads the video by less than approximately 100 ms. It is noted that, since light travels faster than sound, humans are generally accustomed to seeing an event before hearing it, and thus as humans are generally less sensitive to audio-lagging desynchronization. It may therefore be desirable to limit the search for video events to video events that occur, relative to their corresponding audio events, in or near the detectability window (−125 ms to +45 ms) or that occur in or near the acceptability window (−200 ms to +100 ms). As non-limiting examples, the system may search for a video event that occurs within a time window that includes the time of the detect audio event and that spans no more than about 300 ms, about 320 ms, about 340 ms, about 360 ms, about 380 ms, about 400 ms, about 500 ms, about 750 ms, about 1 second, or that spans no more than about 2 seconds. Limiting the amount of video that is searched for a video event (108) may also make it computationally easier to search for the video event, as the entirety of the video stream need not be searched. In such implementations and if the system is able to detect a corresponding video event (in 108) that occurs within or near the detectability and/or acceptability windows, relative to the detected audio event, the system can conclude that the video and audio streams are likely synchronized (112) and can provide a suitable notification that the streams are synchronized and/or continue with analyzing additional segments of the media content. In some implementations and even though any desynchronization may be relatively small (e.g., within or just above the acceptability range), the system can also measure the amount of desynchronization (in 112), by comparing the timestamps of the detect audio and video events. The system may then use that measurement in removing any desynchronization (e.g., re-synchronizing the video and audio streams). However, if the system is unable to detect a corresponding video event (in 108), then the system can conclude that the video event may occur outside the detectability and/or acceptability windows, relative to the detected audio event. Thus, the system can conclude, if an audio event, but no video event is detected, that the video and audio streams are likely desynchronized and can provide a notification of potential desynchronization (110).

In some implementations and after the system detections that the content is potentially desynchronized (110), the system may optionally expand the expand the search for a corresponding video event (114). In particular, rather than focusing on portions of the video stream that are within the detectability or acceptability window relative to the detected audio event, the system may search for video events that are outside the detectability or acceptability window. As examples, the system may search portions of the video stream that precede or follow the detected audio event by up to 200 ms, up to 400 ms, up to 500 ms, up to 1 second, up to 2 seconds, up to 5 seconds, or more than 5 seconds. If the system detects the corresponding video event with the expanded search (114), the system may measure the amount of desynchronization and use the measurement in re-synchronizing the content. As an example, if the system detects the video event lagging the audio event by 1 second, the system may advance the video stream relative to the audio stream (and/or delay the audio stream relative to the video stream) by 1 second. Similarly, if the system detects the video event leading the audio event by 1 second, the system may delay the video stream relative to the audio stream (and/or advance the audio stream relative to the video stream) by 1 second. In this manner, the system may be able to correct desynchronization errors.

The amount of video that is searched (in 108) may be further reduced by use of a pose detector and/or a region-of-interest detector, in some implementations. As an example, a pose detector and/or a region-of-interest detector may be used to identify the position of tennis players and a tennis ball in a frame of video. The video-focused machine learning model that searches for video events may then utilize as its input only the small portions of the video frames that include the tennis player(s) and/or tennis ball, further reducing the computational burden and complexity of identifying video events.

The machine learning model that searches for video events may be trained to identify the presence of visible events such as, but not limited to, a tennis ball bouncing off a court, a tennis ball being hit by a racket, a tennis ball bouncing on a court, a basketball bouncing on a court or other structure, a baseball being hit by a bat, a cricket ball being hit by a bat, or any other suitable visual event. In some implementations, there may be multiple machine learning models, each of which is trained to recognize a different type of visual event. As examples, there may be a first machine learning model trained to recognize tennis ball bounces and hits within a broadcast of a tennis match, a second machine learning model trained to recognize baseballs being hit by a batter within a broadcast of a baseball game, a third machine learning model trained to recognize basketballs bouncing on the court within a broadcast of a basketball game, and there may additional machine learning models trained to recognize visual events (associated with recognizable audio events) in other contexts including non-sports contexts.

Separate machine learning models for identifying audio events and for identifying video events were trained using a database of over 400,000 frames from four separate tennis matches. The frames of the training data were manually labeled as a "hit" (i.e., a ball hit by a player's racquet), as a "bounce" (i.e., a ball bouncing off the playing surface), or as "not a hit or bounce." There were approximately 1500 hits within the dataset. Thus, there is a data imbalance of 200:1 of negatives (i.e., not hits) to positives (i.e., hits). Nonetheless, this training data was used in training separate machine learning models for identifying bounces and hits in the audio and video stream of a tennis match. Because the audio and video streams of the training data were synchronized, the manual labelling involved identifying within video frames the time of a bounce or hit, and then labeling the corresponding instance in the audio stream as a bounce or a hit. Because the ball sometimes gets hit or bounces between frames, it may be desirable to label both frames on either side of the actual hit or bounce as hits or to label a block of three frames that span the time of the actual hit or bounce. If desired, the audio-focused machine learning model may be trained in a first stage using a balanced set of training data of roughly equal numbers of positives (hits and bounces) and negatives and then subsequently trained in a second stage using the entire set of training data.

The video-focused machine learning model may, in some implementations, be a mixed-convolution (MC) network. The video-focused machine learning model may have initial layers that 3D convolution layers and subsequent layers that are 2D convolution layers with residual skip connections. Ball hits and bounces, at least for tennis, may be characterized by the position of the ball, the movement of the racquet, and the pose of the player, among other things. In an example, a video-focused machine learning model was trained in three stages of increasing levels of difficult. In the first stage, the video-focused machine learning model was trained using a randomly sampled and balanced dataset, which included all of the positive hits (but not bounces) in the training set and a random sampling of an equal number of the negatives in the training set. In the second stage, the video-focused machine learning model was trained on distinguishing between bounces and hits using a dataset having both positive bounces and positive hits. In the third stage, frames that were adjacent to "hit" frames were labeled as negatives and the machine learning model was trained on the resulting data. In particular, the 6 video frames that come after each labeled hit and the 3 video frames that come before each labeled hit were labeled as not-hits or negatives. This third stage of training improves the performance of the machine learning model at very high resolution levels (e.g., frames that are very close to each other temporally).

In some implementations, the system may search for video events in a window that extends from any desired time before the time of the detected audio event to any desired time after the detected audio event. However, as noted above, it may be desirable to limit the search for video events to a relatively small window that is associated with the desired level of sensitivity to desynchronization. It is noted that, as the duration of the searched window increases, the level of desynchronization needed before the system identifies the media content as being potentially desynchronized increases. As examples, the system may search for the video event (in 108) among video frames in a window that starts about 300 ms, about 250 ms, 200 ms, about 180 ms, about 160 ms, about 140 ms, about 120 ms, about 100 ms, about 80 ms, about 60 ms, or about 40 ms before the detected audio event and that ends about 80 ms, about 100 ms, about 120 ms, about 140 ms, about 160 ms, about 180 ms, about 200 ms, about 220 ms, about 220 ms, about 240 ms, about 260 ms, about 280 ms, or about 300 ms after the detected audio event. In one example, the system may search for the video event (in 108) among video frames in a window that extends from 80 ms before the time of the detected audio event to 240 ms after the time of the detected audio event. In some implementations, the window of time that is searched (in 108) is defined in terms of video frames. As an example, the system may search for the video event some number of video frames before the time of the detected audio event and some additional number of video frames after the time of the detected audio event. In some implementations, the system searches for video events using a machine learning model that takes as its inputs three frames. In such implementations, the window of time that is searched in (108) may include a block of three video frames that immediately precede the time of the detected audio event and two blocks of three video frames that immediately follow the time of the detected audio event.

In some implementations, the system may search for video events in a window that is adjusted based on a previously-determined offset between audio and video streams. In particular, if the system detects a first offset between the audio and video streams at a first point along the media content timeline, the system may utilize that first offset in determining how far before and after the detected audio event to search for a video event. As an example, the system may search for a first video event within a temporal window that extends from about 80 ms before to about 240 ms after a first detected audio event along a media content timeline shared by the video and audio streams. In this example, the system may fail to identify the first video event, may then expand the temporal window, and may then detect the first video event at 300 ms after the first detected audio event (therefore determining the video is lagging the audio by 300 ms at the time of the first audio event in the media timeline). Subsequently, the system may identify a second audio event and then search for a second video event within a temporal window modified in light of the prior synchronization results. As a first example, the system may search for a second video event within a temporal window modified that is temporally centered relative to the previously-determined de-synchronization, by searching for a second video event from about the time of the second audio event to about 600 ms after the second audio event. As a second example, the system may search for a second video event from about 240 ms after to about 540 ms after the second audio event (e.g., providing the same temporal window of −80 ms to +240 ms, but relative to the previously-detected offset instead of relative to the currently-detected audio event). As another example, the system may search for a first video event within a temporal window that extends from about 80 ms before to about 240 ms after a first detected audio event along a media content timeline shared by the video and audio streams. In this example, the system may identify the first video event at 200 ms (as an example) after the first detected audio event. Subsequently, the system may identify a second audio event and then search for a second video event within a temporal window that extends from about 120 ms after to about 440 ms after a second detected audio event (e.g., a similar −80 ms to +24 ms window, but modified by the previously-determined offset of +200 ms). These are merely illustrative examples and, in general, any of the examples of the temporal windows described herein may be determined relative to a currently-detected audio event or, if desired, relative to a previously-detected offset. Adjusting the temporal window for searching for a matching video event based on a previously-detected offset rather than purely based on a currently-detected audio event may assist in differentiating between a fixed offset and a drifting offset (e.g., an offset that varies along the media timeline).

The machine learning models used in searching for audio events (106) and in searching for corresponding video events (108) may be configured to provide the aggregate system with a high or maximized level of precision in detecting audio-visual desynchronization, even at the expense of recall. In the present context of pattern recognition, precision refers to the number of correct identifications divided by the total number of identifications, while recall refers to the number of correct identifications divided by the total number of possible identifications. In other words, the precision of the aggregate system refers to what percentage of the identifications of potential desynchronization actually reflect desynchronized content, while the recall of the aggregate system refers to what percentage of desynchronized pairs of audio events and video events are not identified as potential desynchronization.

As an example, the audio-focused machine learning model (used in 106) may be configured with a high or maximized level of precision, even at the expense of a relatively low level of recall. In other words, the audio-focused machine learning model (used in 106) may be configured in a manner that reduces or minimizes the number of false positives (i.e., identifications of audio events that are not actually present), at the cost of an increased number of false negatives (i.e., non-identifications of audio events that are actually present). This kind of configuration may help to reduce or eliminate the false identification of audio events, which have a high probability of resulting in a false determination of desynchronization.

In contrast, the video-focused machine learning model (used in 108) may be configured with a high or maximized level of recall, even at the expense of a relatively high number of false positives. In other words, the video-focused machine learning model (used in 108) may be configured in a manner that decreases or minimizes the number of video events that are present, but not detected, at the cost of an increased number of false positives (i.e., identifications of video events that aren't actually present). This kind of configuration may help to reduce the system's aggregate precision in identifying desynchronization.

It is further noted that the audio and video events of interest may be events that recur repeatedly in the content. Thus, each audio-video event pair forms a unique opportunity to detect desynchronization and even when the system fails to detect actual desynchronization for a first audio-video event pair, the system may successfully detect actual desynchronization for a second audio-video event pair in the content. In contrast, if the system were to identify desynchronization where no such desynchronization actually exists, the system might false report the audio and video streams in the content are desynchronized. If desired, the potential for false positives may be further reduced by only providing notification of potential desynchronization (110) upon the detection of an audio event without a corresponding video event within the subject content at least two times, at least three times, at least four times, at a frequency of at least one time per 20 minutes of content, at a frequency of at least one time per 10 minutes of content, at a frequency of at least one time per 5 minutes of content, at a frequency of at least one time per minute of content, or upon some other similar threshold. The repeated nature of the audio-video event pairs also means that drifts between the video and audio streams that occur within a piece of content can be detected.

FIG. 2 illustrates an example of a computing environment in which a video content service 202 provides live streaming content and video-on-demand (VOD) content (e.g., audio or video) via network 204 to a variety of client devices (206a-e) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc.

Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

Server 203 includes one or more processors 208, one or more encoders 209, one or more data stores 212, and other hardware and/or software components to encode media content and provide the encoded media content to client devices 206a-e. Server 203 may be implemented by a variety of physical servers and/or virtual servers. In some implementations, server 203 is partitioned to have several virtual servers configured to perform different functions. In one example, one virtual server searches for and identifies audio events, while a second virtual server searches for and identifies video events. Server 203 includes logic configured to detect desynchronization between audio and visual streams (e.g., as represented by desynchronization detection logic 210).

Encoder 209 encodes media content that it receives from content providers such as, for example, content service 202, a third party content provider, an advertisement exchange server, etc. Encoding parameters and/or profiles are used to encode and package fragments of media content at various bitrates. Content may be encoded using a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). For example, client device 206a might receive fragments encoded at a bitrate of 3,200 kbps, and client device 206b might receive fragments encoded at a bitrate of 2,400 kbps. And depending on their network conditions might both begin to receive fragments at a bitrate of 3,200 kbps. After an encoding process, encoded fragments are stored in memory such as a local buffer for delivery to CDN 214 or to client devices 206a-e.

In addition to providing access to media content, server 203 may also provide a variety of information related to the media content (e.g., various types of metadata and manifest data in data store 212 to which service 202 provides access). Alternatively, such information about the media content, as well as the media content itself may be provided and/or hosted by one or more separate platforms or databases, e.g., CDN 214. CDN 214 may help facilitate distribution of media content through a variety of software, hardware, and network components to client devices according to geographic proximity. It should be noted that while logic 210 and data store 212 are contemplated as integrated with server 203 of content service 202, implementations are also contemplated in which either or both operate remotely from the associated content service, and/or either or both are under the control of an independent entity. From these examples, those of skill in the art will understand the diversity of use cases to which the techniques described herein are applicable.

Client devices 206a-e can also include various types of logic, for instance, decoder logic for decoding the encoded media content received from edge server 204a and playback handling logic to request playback of portions of media content. In addition, client devices 206a-e includes various types of memory to store and/or cache decoded media, one or more processors, and other hardware components to request and decode the encoded media content provided by server 203. For example, the processors of client devices 206a-e execute stored instructions in memory to implement decoding and content retrieval techniques to acquire and play back content provided in accordance with the techniques disclosed herein. In addition, client devices 206a-e may communicate with server 203 through different types of network protocols such as a stateful connection, e.g., a physical socket connection between server and client, or using a stateless connection, for instance, using the Hypertext Transfer Protocol (HTTP).

It should be noted that, despite references to particular computing paradigms and software tools herein, the computer program product and the computer program instructions on which various implementations disclosed herein are based may correspond to any of a wide variety of programming languages, software tools, and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more processors and memory configured to:
    obtain media content including a video stream and an audio stream that share a media content timeline;
    identify, using a first machine learning model and within the audio stream, an audio event at a given time in the media content timeline, wherein the audio event comprises a ball bouncing or being hit;
    based on the identification of the audio event at the given time, search, using a second machine learning model and within a portion of the video stream, for a video event, wherein the video event comprises a ball bouncing or being hit, wherein the portion of the video stream includes the given time in the media content timeline; and
    provide an indication that the video stream and the audio stream of the media content are desynchronized based on a failure of the second machine learning model to identify the video event of the ball bouncing or being hit within the portion of the video stream.

2. The system of claim 1, wherein the first machine learning model is configured to identify audio events of a tennis ball bouncing or being hit by a tennis racquet and wherein the second machine learning model is configured to identify, within one or more image frames, video events of a tennis ball bouncing or being hit by a tennis racquet.

3. The system of claim 1, wherein the portion of the video stream includes no more than (a) 80 ms of the video stream that immediately precede the given time in the media content timeline and (b) 240 ms of the video stream that immediately follows the given time in the media content timeline.

4. The system of claim 1, wherein the one or more processors and memory are configured to identify regions of image frames that contain a ball or a player and to provide the identified regions of the image frames to the second machine learning model as part of searching for the video event of the ball bouncing or being hit.

5. The system of claim 1, wherein the one or more processors and memory are configured to obtain the media content during a live event and provide the indication that the video stream and the audio stream of the media content are desynchronized in real-time during the live event.

6. A system, comprising one or more processors and memory configured to:
    obtain, during a live event, a livestream of the live event, the livestream including a live video stream and a live audio stream that share a media content timeline;
    identify, within the live audio stream, an audio event at a given time in the media content timeline;
    search, within a portion of the live video stream, for a video event using a machine learning model, wherein the video event corresponds to the audio event, wherein the portion of the live video stream includes the given time in the media content timeline; and
    provide, during the live event, an indication that the live video stream and the live audio stream of the media content are desynchronized based on a failure to identify the video event within the portion of the live video stream.

7. The system of claim 6, wherein the audio event comprises audio of an object bouncing or being hit and wherein the video event comprises one or more video frames showing an object bouncing or being hit.

8. The system of claim 6, wherein the audio event is identified as occurring at a first time in the media content timeline and wherein the one or more processors and memory are further configured to:
    identify, within an additional portion of the live video stream, the video event occurring at a second time in the media content timeline, wherein the additional portion of the live video stream includes at least one of (a) sections of the live video stream that precede the portion of the live video stream and (b) sections of the live video stream that follow the portion of the live video stream;
    provide, during the live event, a measurement of a desynchronization between the live video stream and the live audio stream, the measurement being based on the first time of the identified audio event and the second time of the identified video event; and
    synchronize the live video stream with the live audio stream by delaying or advancing the live video stream and/or by delay or advancing the audio stream based on the measurement of the desynchronization.

9. The system of claim 6, wherein the portion of the video stream includes no more than 320 ms of the video stream.

10. The system of claim 6, wherein the portion of the video stream includes no more than (a) 80 ms of the video stream that immediately precede the given time in the media content timeline and (b) 240 ms of the video stream that immediately follows the given time in the media content timeline.

11. The system of claim 6, wherein the one or more processors and memory are configured to identify the audio event by dividing the audio stream into audio sections of 160 ms duration and searching for the audio event within the audio sections of 160 ms duration.

12. The system of claim 6, wherein the one or more processors and memory are configured to search, within the portion of the video stream, for the video event using a machine learning model that takes as its inputs three adjacent video frames and that outputs an indication of whether or not video event occurs within or between those three adjacent video frames.

13. A method, comprising:
obtaining, during a live event, a livestream of the live event, the livestream including a live video stream and a live audio stream that share a media content timeline;
identifying, within the live audio stream, an audio event at a given time in the media content timeline;
searching, within a portion of the live video stream, for a video event using a machine learning model, wherein the video event corresponds to the audio event, wherein the portion of the live video stream includes the given time in the media content timeline; and
providing, during the live event, an indication that the live video stream and the live audio stream of the media content are desynchronized based on a failure to identify the video event within the portion of the live video stream.

14. The method of claim 13, wherein the audio event comprises audio of an object bouncing or being hit and wherein the video event comprises one or more video frames showing an object bouncing or being hit.

15. The method of claim 13, wherein the audio event is identified as occurring at a first time in the media content timeline, the method further comprising:
identifying, within an additional portion of the live video stream, the video event occurring at a second time in the media content timeline, wherein the additional portion of the live video stream includes at least one of (a) sections of the live video stream that precede the portion of the live video stream and (b) sections of the live video stream that follow the portion of the live video stream;
providing, during the live event, a measurement of a desynchronization between the live video stream and the live audio stream, the measurement being based on the first time of the identified audio event and the second time of the identified video event; and
synchronizing the live video stream with the live audio stream by delaying or advancing the live video stream and/or by delay or advancing the audio stream based on the measurement of the desynchronization.

16. The method of claim 13, wherein the searched portion of the live video stream includes no more than 400 ms of the video stream.

17. The method of claim 13, wherein the portion of the video stream includes no more than 320 ms of the video stream.

18. The method of claim 13, wherein the portion of the video stream includes no more than (a) 80 ms of the video stream that immediately precede the given time in the media content timeline and (b) 240 ms of the video stream that immediately follows the given time in the media content timeline.

19. The method of claim 13, wherein identifying the audio event of the ball bouncing or being hit comprises dividing the audio stream into audio sections of 160 ms duration and searching for the audio event within the audio sections of 160 ms duration.

20. The method of claim 13, wherein searching, within the portion of the video stream, for the video event of the ball bouncing or being hit comprises searching for the video event using a machine learning model that takes as its inputs three adjacent video frames and that outputs an indication of whether or not the ball bounces or is hit within or between those three adjacent video frames.

* * * * *